US007430676B2

(12) United States Patent
Baker et al.

(10) Patent No.: US 7,430,676 B2
(45) Date of Patent: Sep. 30, 2008

(54) METHOD AND APPARATUS FOR CHANGING THE CLOCK FREQUENCY OF A MEMORY SYSTEM

(75) Inventors: Paul A. Baker, Los Altos, CA (US); William C. Athas, San Jose, CA (US)

(73) Assignee: Apple, Inc., Cupertino, CA (US)

( * ) Notice: Subject to any disclaimer, the term of this patent is extended or adjusted under 35 U.S.C. 154(b) by 397 days.

(21) Appl. No.: 11/367,813

(22) Filed: Mar. 3, 2006

(65) Prior Publication Data

US 2007/0234100 A1 Oct. 4, 2007

(51) Int. Cl.
*G11C 5/14* (2006.01)
*G11C 8/00* (2006.01)

(52) U.S. Cl. .................. 713/322; 713/300; 713/310; 713/320; 713/321; 713/323; 713/324; 365/226; 365/229

(58) Field of Classification Search .......... 713/300, 713/310, 320–324, 330, 340; 365/226, 229
See application file for complete search history.

(56) References Cited

U.S. PATENT DOCUMENTS

| | | | | |
|---|---|---|---|---|
| 5,371,480 A | * | 12/1994 | Hedberg et al. ............ 331/16 |
| 5,991,889 A | * | 11/1999 | Hikichi et al. ............ 713/501 |
| 7,000,130 B2 | * | 2/2006 | Adachi ................... 713/322 |
| 7,216,248 B2 | * | 5/2007 | Butcher ................... 713/500 |
| 7,221,610 B2 | * | 5/2007 | Yamazoe et al. .......... 365/226 |
| 7,343,508 B2 | * | 3/2008 | Khodorkovsky .......... 713/500 |
| 2006/0041766 A1 | * | 2/2006 | Adachi ................... 713/322 |
| 2006/0233036 A1 | * | 10/2006 | Blodgett et al. ......... 365/230.01 |

* cited by examiner

*Primary Examiner*—Abdelmoniem Elamin
(74) *Attorney, Agent, or Firm*—Park, Vaughan & Fleming LLP

(57) ABSTRACT

One embodiment of the present invention provides a system that facilitates changing a clock frequency in a memory system. During operation, the system receives a command to change the clock frequency to a new clock frequency. The system then iteratively changes the clock frequency to the new clock frequency. More specifically, the system starts an iteration by slewing the clock frequency toward the new clock frequency by an increment to reach an intermediate frequency without interfering with normal memory-system operation. Next, the system signals a memory controller to pause normal memory system operation by completing or cancelling all in-flight or outstanding memory system operations and not accepting additional memory operation requests. Upon receiving an acknowledgement from the memory controller that all in-flight or outstanding memory operations have completed or terminated, the system signals the memory controller to cause a delay-locked loop (DLL) inside the memory system to relock to the intermediate frequency. When the DLL relocks to the intermediate frequency, the system completes the iteration by resuming normal memory system operation.

17 Claims, 4 Drawing Sheets

DYNAMIC MEMORY CLOCK-FREQUENCY-CONTROL ARCHITECTURE 200

METHOD AND APPARATUS FOR CHANGING THE CLOCK FREQUENCY OF A MEMORY SYSTEM

BACKGROUND

1. Field of the Invention

The present invention relates to power-saving techniques in computer systems. More specifically, the present invention relates to a method and apparatus for changing the clock frequency of a memory subsystem for power-saving purposes.

2. Related Art

Modern computing systems are growing increasingly more capable because integrated circuit (IC) chips within these computer systems are operating at increasingly faster clock speeds. At the same time, these IC chips also consume more power due to these faster clock speeds. However, in many computing environments, it is desirable to reduce power consumption, for example, in mobile computing systems.

One common technique to save power is to dynamically manage system power consumption through clock-frequency scaling. For example, the clock frequency for an IC chip may be reduced during periods of operation when workload is light, thereby reducing power-consumption. Reducing the clock frequency in this way also allows the operating voltage to be reduced, thereby enabling even more power savings. Note that when the workload increases again, the clock frequency and voltage can be restored to their previous levels.

A memory subsystem within a computer system consumes a significant amount of power. Hence, providing power savings in a memory subsystem through dynamic clock-frequency scaling is not uncommon. Memory subsystems are commonly designed around double-data-rate (DDR) memory chips, which have become the dominant memory system technology. Such memory subsystems allow the DDR chips to change to a new clock frequency when the chips are in a standard self-refresh mode. More specifically, performing the clock frequency change during the self-refresh mode involves: pausing or discarding all outstanding memory subsystem operations; changing the clock frequency to a new value; and resuming or repeating the memory operations when the new value is reached.

Unfortunately, suspending memory operations for a long period of time during clock frequency changes is not desirable for many user applications, in particular during real-time applications such as audio and video playback. Hence, it is desirable to change the clock frequency as quickly as possible to minimize the unusable time. However, other system components sharing the same clock source may malfunction during an abrupt change in the clock frequency.

To deal with this problem, the clock frequency can be gradually changed through a "slew" operation using a phase-lock loop (PLL), which allows the clock frequency to ramp up or down slowly and continuously with tolerable phase noise. Unfortunately, such a frequency-slew operation may conflict with the effective phase-tracking range of downstream delay-locked loops (DLLs), which are typically found in the DDR memory chips. Commonly, DLLs are used in DDR chips to reduce clock skew in different parts of the memory and to synchronize data output timing with the input clock. Generally, DLLs in DDR chips can dynamically track small phase changes induced by clock frequency shifts and can realign to the clock. However, when the cumulative frequency change becomes larger than the DLL's tracking ranging, the DLL tracking will fail, which will necessitate a reset of the DLL, so that the DLL can relock to the clock. As a result, the frequency-slew operation will have to be halted.

Hence, there is a need for a clock-frequency changing technique which can simultaneously accommodate requirements for the PLL, the DLL, memory components, and user applications during a clock frequency change.

SUMMARY

One embodiment of the present invention provides a system that facilitates changing a clock frequency in a memory system. During operation, the system receives a command to change the clock frequency to a new clock frequency. The system then iteratively changes the clock frequency to the new clock frequency. More specifically, the system starts an iteration by slewing the clock frequency toward the new clock frequency by an increment to reach an intermediate frequency without interfering with normal memory-system operation. Next, the system signals a memory controller to pause normal memory system operation by completing or cancelling all in-flight or outstanding memory system operations and not accepting additional memory-operation requests. Upon receiving an acknowledgement from the memory controller that all in-flight or outstanding memory operations have completed or terminated, the system signals the memory controller to cause one or more DLLs inside the memory system to relock to the intermediate frequency. When the DLL relocks to the intermediate frequency, the system completes the iteration by resuming normal memory-system operation.

In one embodiment of the present invention, the clock frequency is generated by a PLL.

In a further embodiment, slewing the clock frequency towards the new frequency by the increment involves gradually changing the clock frequency generated by the PLL.

In one embodiment of the present invention, causing the DLL to relock involves: (1) causing the memory system to enter and exit a self-refresh mode, wherein exiting the self-refresh mode causes the DLL to relock; or (2) issuing an explicit DLL reset command to the DLL.

In one embodiment of the present invention, the signaling of the memory controller to pause the normal memory system operation can take place prior to reaching the intermediate frequency.

In a further embodiment, the system uses a first register to store a target value for the clock frequency which represents the new clock frequency, and additionally uses a second register to store a step size which specifies the size of the increment.

In a further embodiment, initiating a subsequent iteration after completing an iteration involves using a finite-state-machine (FSM) controller to increment/decrement a frequency synthesis parameter in the PLL toward the target value by the step size.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Computer System

Figure 1:
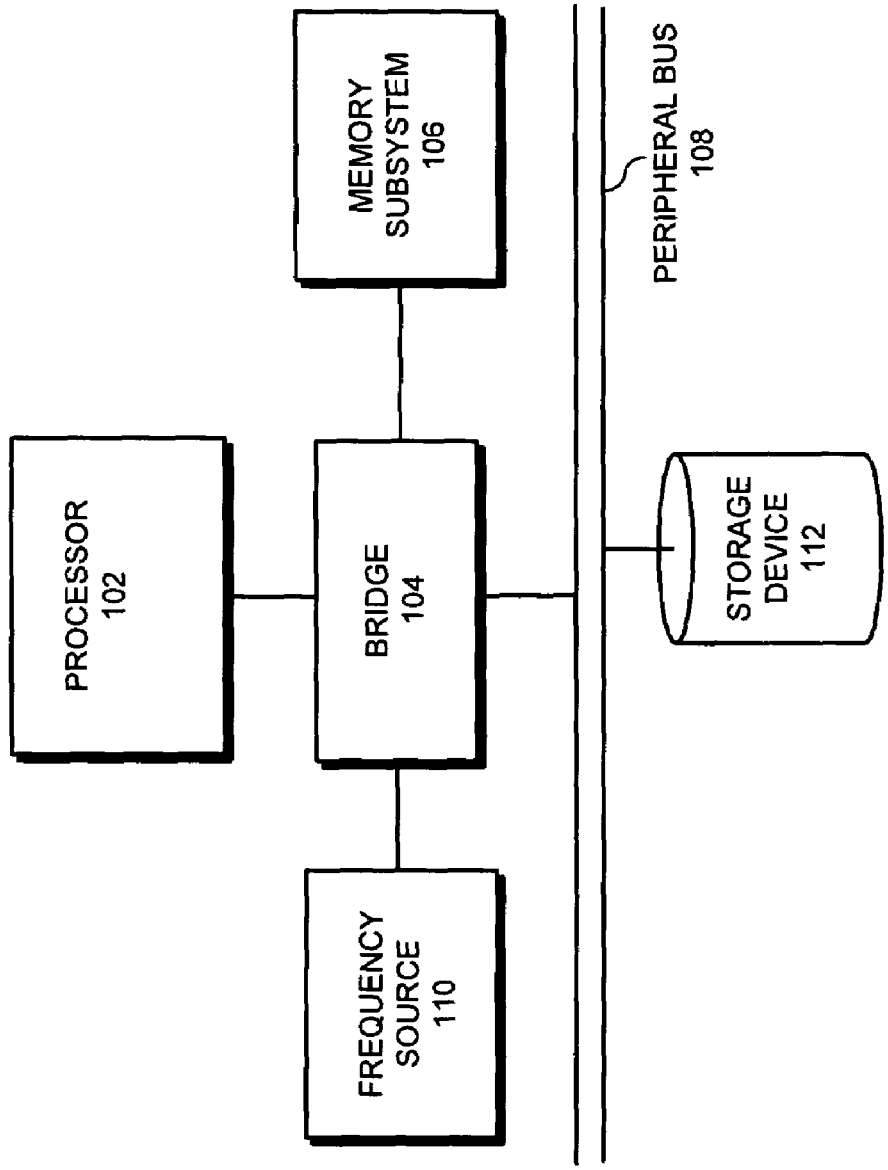
FIG. 1 illustrates a computer system in accordance with an embodiment of the present invention.

FIG. 1 illustrates a computer system 100 in accordance with an embodiment of the present invention. As illustrated in FIG. 1, computer system 100 includes processor 102, which is coupled to a memory subsystem 106 and to peripheral bus 108 through bridge 104. Bridge 104 can generally include any type of circuitry for coupling components of computer system 100 together. It should be recognized that one or more components of the computer system 100 may be located remotely and accessed via a network.

Processor 102 can include any type of processor, including, but not limited to, a microprocessor, a mainframe computer, a digital signal processor, a personal organizer, a device controller and a computational engine within an appliance.

Processor 102 communicates with memory subsystem 106 through bridge 104. Memory subsystem 106 can include a number of components, including one or more memory chips which can be accessed by processor 102 at high speed. Memory subsystem 106 receives a clock signal from bridge 104, which determines the speed of the memory operation. More specifically, memory subsystem 106 receives the clock signal from frequency source 110, and subsequently sends the clock signal to memory subsystem 106. Note that frequency source 110 may be alternatively embedded in bridge 104.

Processor 102 also communicates with storage device 112 through bridge 104 and peripheral bus 108. Storage device 112 can include any type of non-volatile storage device that can be coupled to a computer system. This includes, but is not limited to, magnetic, optical, and magneto-optical storage devices, as well as storage devices based on flash memory and/or battery-backed up memory.

Note that although the present invention is described in the context of computer system 100 illustrated in FIG. 1, the present invention can generally operate on any type of computing device that supports clock-frequency change. Hence, the present invention is not limited to the computer system 100 illustrated in FIG. 1.

Memory Clock-Frequency-Control Architecture

Figure 2:
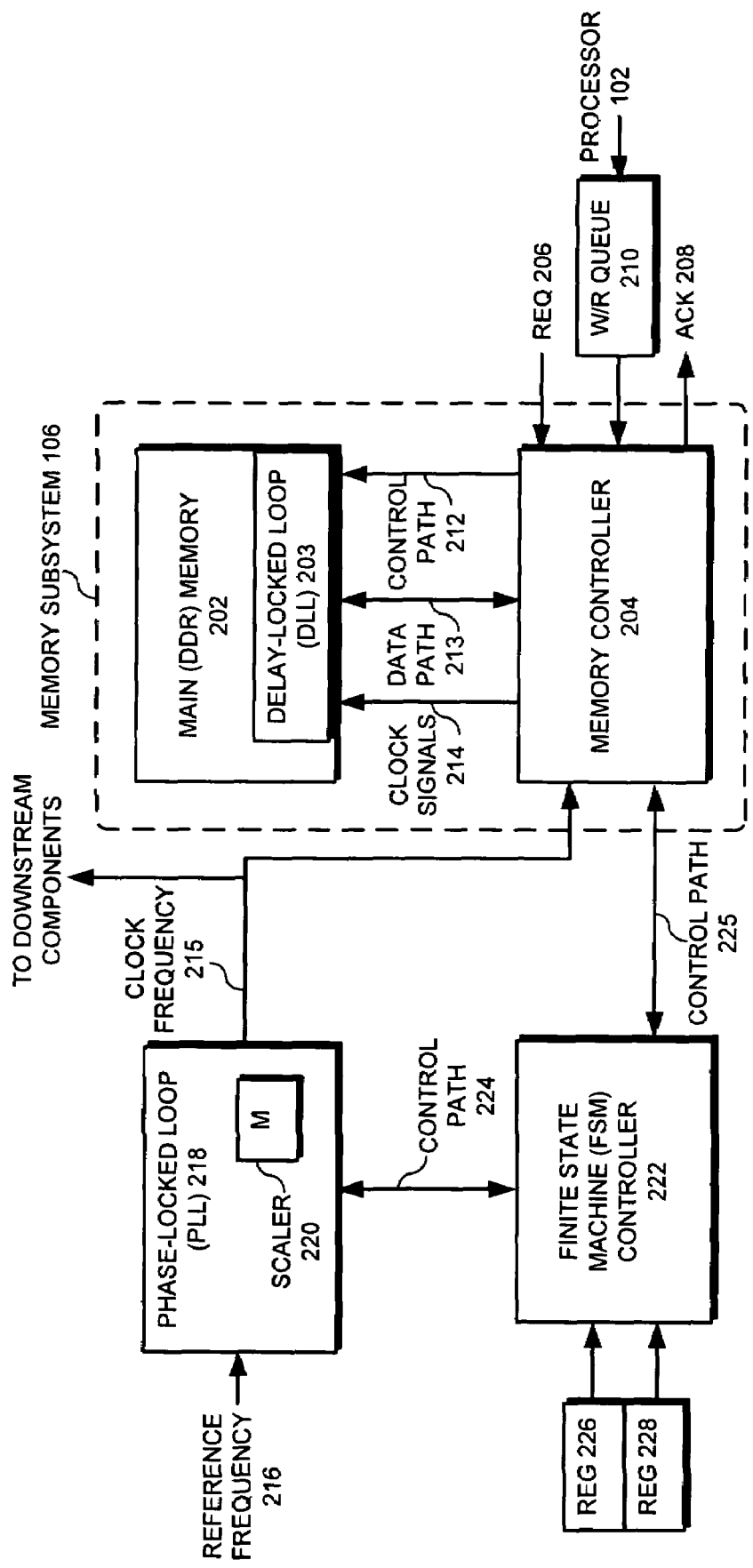
FIG. 2 illustrates a system diagram of a memory clock-frequency-control architecture in accordance with an embodiment of the present invention.

FIG. 2 illustrates a system diagram of dynamic memory clock-frequency control architecture 200 in accordance with an embodiment of the present invention. The system is comprised of a number of components, including memory subsystem 106, phase-locked loop 218, and finite state machine (FSM) controller 222.

Memory subsystem 106 includes main memory 202 and memory controller 204. Main memory 202 can include any type of memory that can store code and data for execution by processor 102. This includes, but is not limited to, static random access memory (SRAM), dynamic RAM (DRAM), magnetic RAM (MRAM), non-volatile RAM (NVRAM), flash memory, and read only memory (ROM). Main memory 202 can further include one or more memory chips.

In one embodiment of the present invention, main memory 202 is a DDR SRAM memory. Typically, a DDR SRAM memory contains a DLL 203. DLL 203 dynamically tracks the phase of the input clock signal and aligns the input clock signal to the distributed clocks in different sections of main memory 202, thereby minimizing skew in the data timing relative to the input clock.

Main memory 202 indirectly interacts with processor 102 through memory controller 204, which provides an interface between the two components. During operation, memory controller 204 receives memory access request signals on REQ line 206, and returns acknowledgement signals on ACK line 208. An actual memory read/write request can be sent by processor 102 only if an acknowledgement is received. Memory controller 204 additionally manages memory read/write requests in an input queue 210. Queue 210 may be implemented in hardware devices such as a FIFO buffer, or other equivalents. A memory read/write request typically includes an address of the memory location, and an indicator specifying the type of request.

In one embodiment of the present invention, memory controller 204 controls the operation of main memory 202 by sending control signals and address information on control path 212. Additionally, data items which are written to and read from memory main memory 202 are transmitted on data path 213.

Note that memory controller 204 also provide clock signals 214 directly to main memory 202. Specifically, memory controller 204 first receives an external clock frequency 215 which is generated by a frequency synthesizer, i.e., PLL 218. Next, memory controller 204 synthesizes clock frequency 215 into clock signals 214, which is then provided to main memory 202.

PLL 218 synthesizes clock frequency 215 based on a reference frequency 216. Reference frequency 216 may be generated by a crystal oscillator or a silicon-based oscillator circuit. Clock frequency 215 is typically synthesized by multiplying reference frequency 216 with a programmable scaling factor.

PLL 218 is typically fully programmable to allow a controlled clock-frequency generation. For example, PLL 218 can include a scaler 220, which specifies a multiplication factor M for frequency synthesis. In one embodiment of the present invention, scaler 220 is externally controlled by an FSM controller 222. Specifically, FSM controller 222 can initiate a change of clock frequency 215 to a new frequency by updating scaler 220 to a target value corresponding to the new frequency. Upon receiving the new target value, PLL 218 begins to change (slew) toward the target frequency, and eventually locks onto the target frequency. FSM controller 222 and PLL 218 interact with each through control path 224. Note that clock frequency 215 may be used by other system components, such as downstream PLLs. A more-detailed description of a PLL is provided below.

Besides controlling scaler 220, FSM controller 222 interfaces between PLL 218 and memory controller 204, and indirectly interacts with main memory 202 though memory controller 204. More specifically, FSM controller 222 can concurrently control PLL 218 to synthesize a new frequency and coordinate read/write operations in main memory 202 during the course of the frequency change. FSM controller 222 and memory controller 204 communicate with each other through control path 225.

Note that in the present invention, FSM controller 222 controls the clock frequency change towards a target value in discrete steps. In one implementation, FSM controller 222 additionally receives two values from registers 226 and 228.

Register 226 contains the target value for scaler 220 corresponding to the target clock frequency, while register 228 contains a size of the step for each increment/decrement of scaler 220 during a frequency change.

Frequency-Slew Operation

Figure 3:
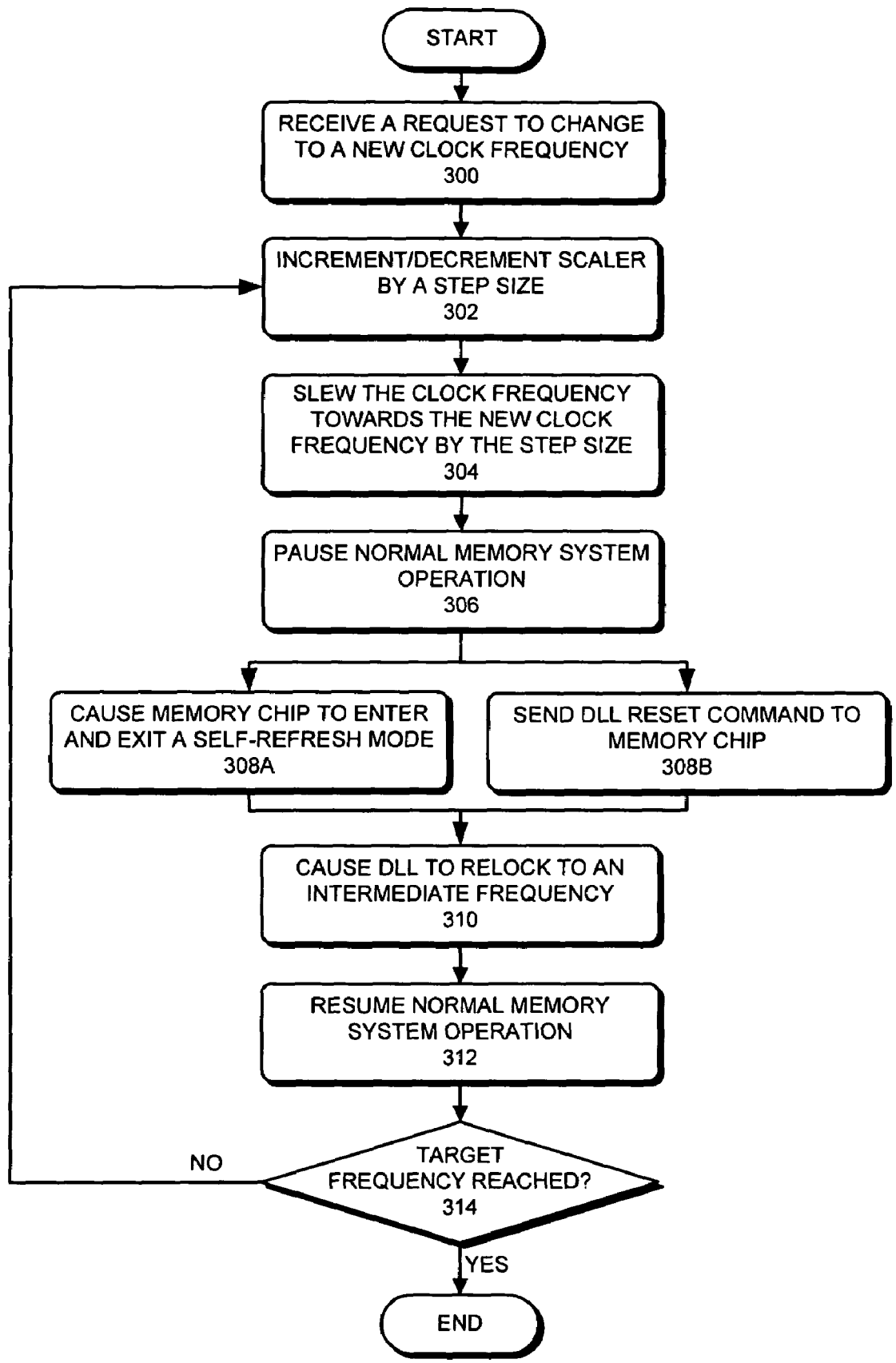
FIG. 3 presents a flowchart illustrating a process of changing a clock frequency through a frequency-slew operation in accordance with an embodiment of the present invention.

FIG. 3 presents a flowchart illustrating the process of changing a clock frequency through a frequency-slew operation in accordance with an embodiment of the present invention.

Before the process starts, an operating system, a runtime system, or an application issues a command to change the clock frequency of main (DDR) memory 202. In one embodiment of the present invention, the system writes a new target value in register 226 which corresponds to a new clock frequency.

Upon receiving the request (step 300), FSM controller 222 initiates the frequency change by incrementing/decrementing the current value of scaler 220 inside PLL 218 towards the target value by a step size stored in register 228 (step 302). Note that register 228 may further comprise a set of registers, wherein each of the set of registers contains a different step size. FSM controller 222 may select a step size from the set of step sizes stored in register 228.

Updating scaler 220 triggers PLL 218 to slew the clock frequency toward the new clock frequency by the step size. It does so by gradually ramping the clock frequency to reach an intermediate frequency (step 304). Note that, during the frequency-slew process, DDR memory 202 and memory controller 204 continue to operate normally without interruption.

Note that, normal memory operation during frequency-slew step 304 is possible because DLL circuits 203 in DDR memory 202 continuously tracks the phase of the input clock signal while the input clock frequency changes, so long as the frequency change is within limits of a "DLL phase-tracking range." However, when the input frequency change is beyond the phase-tracking range, the normal operation of both DLL 203 and DDR memory 202 are interrupted. Consequently, the largest possible frequency-slew step size can be determined based on the DLL phase-tracking limitations to make sure memory 202 can operate normally during the slew step 304.

The duration of frequency-slew step 304 depends on the step size specified in register 228, for example, a larger step size may take a longer time. In one implementation, FSM controller 222 determines the frequency-slew step 304 has completed upon receiving a confirmation signal from PLL 218. Alternatively, FSM 222 can wait a predetermined amount of time which is guaranteed to be larger than the time required for the slew to complete.

When the slew step 304 is completed, FSM controller 222 signals memory controller 204 to pause the normal memory-system operation by completing or cancelling all in-flight memory system operations and not accepting additional memory access requests. Upon receiving the command, memory controller 204 pauses normal memory operations and acknowledges the pause request back to FSM controller 222 once all outstanding in-flight memory read/write operations have completed or have been cancelled (step 306).

Upon receiving the acknowledgement from memory controller 204, FSM controller 222 signals memory controller 204 to place circuits in DDR memory 202 into a self-refresh mode and then to immediately exit the self-refresh mode (step 308A). The process of exiting the self-refresh mode automatically causes DLL 203 inside DDR memory 202 to reset. Note that certain types of memory chips require receiving an explicit DLL reset command to reset a DLL unit (step 308B). These reset operations enable DLL 203 to relock to the intermediate frequency that may be beyond the phase-tracking range (step 310). Next, memory controller 204 and DDR memory 202 return to normal memory operation and memory controller 204 starts accepting new requests for memory transactions (step 312).

Next, FSM controller 222 determines if the new target frequency has been reached (step 314). Specifically, the system can check if the value of scaler 220 in PLL 218 equals the value of register 226. If so, the frequency change is completed. Otherwise, the process returns to step 302 and frequency-slew operation continues. Note that, the final frequency increment/decrement in step 302 may be smaller than the value stored in register 228 so that the final value does not "overstep" the target value.

Note that, by taking discrete small steps to complete a relatively large clock frequency change, the process does not have to halt the normal memory operation through the full course of the clock frequency change. Instead, the memory operation is only paused briefly during each of the self refresh and reset cycle of the memory circuits, which typically lasts for hundreds to thousands of clock cycles, or possibly up to tens of microseconds. In comparison, stopping memory operation during one step frequency-slew may take as long as a few milliseconds. Also note that the process can choose to pause the memory operation when convenient, for example, when the memory controller is idle.

Variations of Frequency-Slew Operation

A number of variations can be made to the above-described frequency-slew process, each with its own merits and trade-offs.

In one embodiment, FSM controller 222 can issue the pause request to memory controller 204 prior to the completion of the frequency-slew step 304. This may reduce latency for completing steps 304 and 306 by overlapping the end of step 304 with the beginning part of step 306.

In one embodiment, the system can also monitor memory controller operation. If there is no request in the queue 210 (so that memory controller 204 is idle), FSM controller 222 can simply execute only step 302 and step 304 repeatedly towards the target frequency while the memory circuits are placed in an extended self-refresh mode. This is similar to suspending the memory operation during a conventional frequency-change process, except that no memory operation is required. By skipping steps 306, 308, and 310, the overall frequency-slew operation can be significantly shortened. Once the system detects that new memory access requests have arrived, the system can cause FSM controller 222 to return to the normal or active mode, and simultaneously cause the memory to exit the self-refresh mode.

In one embodiment, the frequency-slew operation can be made to fully remove the dependency on DLL tracking limitations. This can be done by moving step 304 in between steps 308 and 310. Hence, in this case the memory system operation is suspended during the actual frequency-slew process. Consequently, DLL 203 does not see the frequency change. As a trade-off, the portion of the process during which the memory is not available may be longer than the process described in FIG. 3.

PLL

Figure 4:
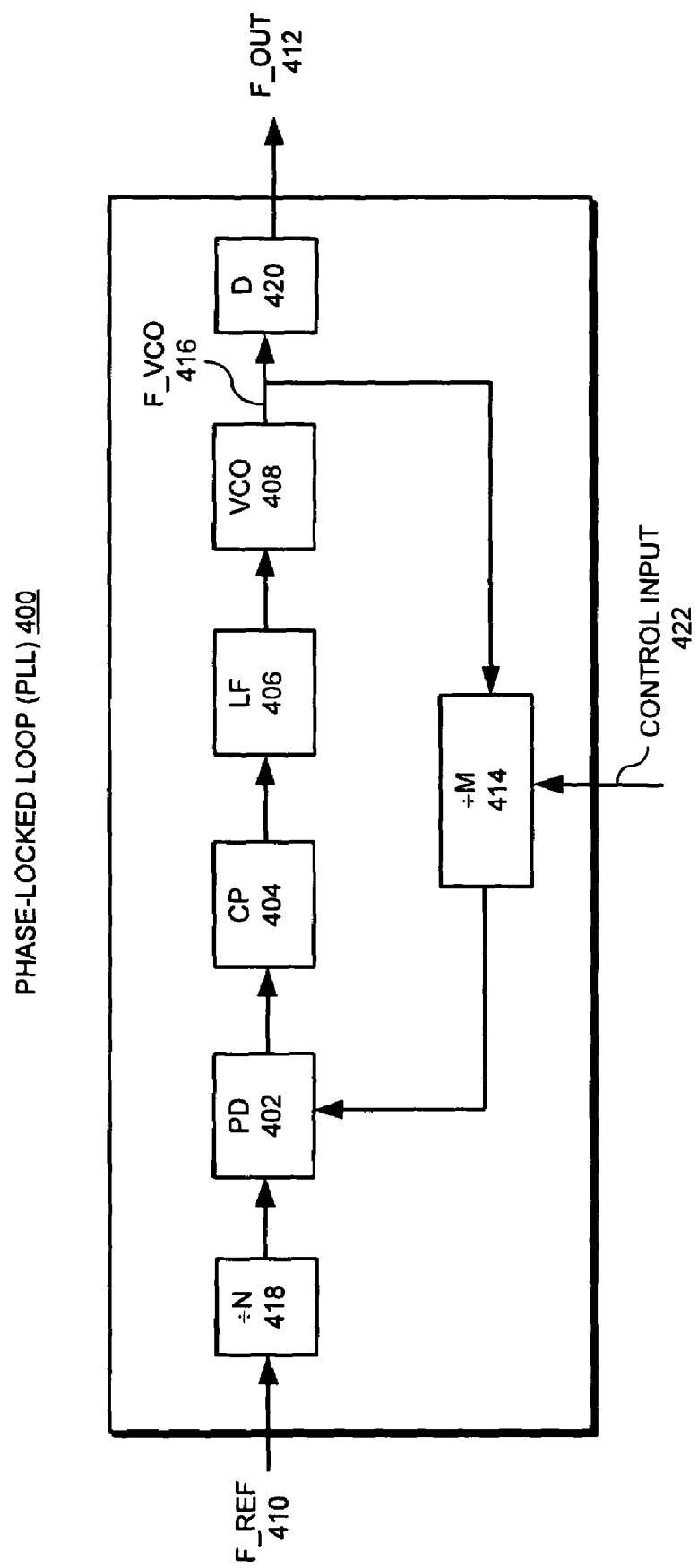
FIG. 4 illustrates a schematic diagram of a typical PLL used in the frequency-slew operation in accordance with an embodiment of the present invention.

FIG. 4 illustrates a schematic diagram of a typical PLL used in the frequency-slew operation in accordance with an embodiment of the present invention. PLL 400 generally includes a phase detector (PD) 402, a charge pump (CP) 404, a low-pass filter (LF) 406, and a voltage-controlled oscillator (VCO) 408. PLL 400 receives a reference clock frequency input ($F_{ref}$) 410 from the left and generates an output frequency ($F_{out}$) 412 on the right. A detailed explanation of the functions of these components can be found in many references that describe PLLs (see Floyd M. Gardner, "Charge-Pump Phase-Lock Loops," IEEE Transactions on Communications, Vol. 28, No. 11, November 1980).

For frequency synthesizing purposes, PLL 400 in FIG. 4 also includes a number of dividers. Divider 414 is placed in between VCO 408 and the feedback input to the PD 402. This is the same component as scaler 220 in FIG. 2, which divides a frequency output $F_{vco}$ 416 from VCO 408 by a factor M. PLL 400 also includes a divider 418 between the reference clock 410 and the reference input to the PD 402, wherein divider 418 divides the reference clock by a factor N. PLL 400 additionally includes an output multiplier 420 that uses a division factor D. The final output of PLL 400, when phase locked, produces the following frequency:

$$F_{out} = \frac{1}{D}\frac{M}{N}F_{ref}. \tag{Eq.1}$$

Note that although it is possible to change the output frequency of PLL 400 using M, N or D, one embodiment of the present invention only changes the M factor, which is program-controlled by external logic through control input 422. It should be recognized that on the right-hand side of Eq. 1, $F_{ref}/(DN)$ is the increment/decrement frequency step used in the frequency-slew process of FIG. 3, provided that register 228 has a value "1." In one embodiment of the present invention, factors D and N may be determined so that $F_{ref}/(DN)$ is less or equal to the DLL phase-tracking range.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for changing a clock frequency in a memory system, comprising:
   receiving a command to change the clock frequency to a new clock frequency; and
   changing the clock frequency to the new clock frequency by iteratively,
      slewing the clock frequency toward the new clock frequency by an increment to reach an intermediate frequency without interfering with normal memory system operation;
      signaling a memory controller to pause normal memory system operation by completing or cancelling all in-flight memory system operations and not accepting additional memory operation requests;
      upon receiving an acknowledgement from the memory controller that all in-flight memory operations have completed or terminated, signaling the memory controller to cause a delay-locked loop (DLL) inside the memory system to relock to the intermediate frequency; and
      when the DLL relocks to the intermediate frequency, resuming normal memory system operation.

2. The method of claim 1, wherein the clock frequency is generated by a phase-locked loop (PLL).

3. The method of claim 2, wherein slewing the clock frequency towards the new frequency by the increment involves gradually changing the clock frequency generated by the PLL.

4. The method of claim 1, wherein causing the DLL to relock involves:
   causing the memory system to enter and exit a self-refresh mode, wherein exiting the self-refresh mode causes the DLL to relock; or
   issuing an explicit DLL reset command to the DLL.

5. The method of claim 1, wherein the signaling of the memory controller to pause the normal memory system operation can take place prior to reaching the intermediate frequency.

6. The method of claim 3, further comprising:
   using a first register to store a target value for the clock frequency which represents the new clock frequency; and
   using a second register to store a step size which specifies the size of the increment.

7. The method of claim 6, wherein initiating a subsequent iteration involves using a finite-state-machine (FSM) controller to increment/decrement a frequency synthesis parameter in the PLL toward the target value by the step size.

8. A computer system that is configured to change a clock frequency in a memory system, comprising:
   a processor;
   a memory subsystem;
   a PLL that generates a clock frequency;
   a FSM controller, wherein upon receiving a command to change the clock frequency to a new clock frequency, the FSM controller is configured to iteratively,
      cause the PLL to slew the clock frequency toward the new clock frequency by an increment to reach an intermediate frequency without interfering with normal memory system operation;
      signal a memory controller to pause normal memory system operation by completing or cancelling all in-flight memory system operations and not accepting additional memory operation requests;
      upon receiving an acknowledgement from the memory controller that all in-flight memory operations have completed or terminated, to signal the memory controller to cause a DLL inside the memory system to relock to the intermediate frequency; and to
      cause the memory subsystem to resume normal memory system operation when the DLL relocks to the intermediate frequency.

9. The computer system of claim 8, wherein slewing the clock frequency towards the new frequency by the increment involves gradually changing the clock frequency generated by the PLL.

10. The computer system of claim 8, wherein causing the DLL to relock involves:
    causing the memory system to enter and exit a self-refresh mode, wherein exiting the self-refresh mode causes the DLL to relock; or
    issuing an explicit DLL reset command to the DLL.

11. The computer system of claim 8, further comprising:
    a first register that stores a target value for the clock frequency, wherein the target value represents the new clock frequency; and
    a second register that stores a step size which specifies the size of the increment.

12. The computer system of claim 11, wherein the FSM controller is configured to initiate a subsequent iteration step after completing an iteration step by incrementing/decrementing a frequency synthesis parameter in the PLL toward the target value by the step size.

13. An apparatus that is configured to change a clock frequency in a memory system, comprising:
   a processor;
   a memory subsystem;
   a PLL that generates a clock frequency;
   a FSM controller, wherein upon receiving a command to change the clock frequency to a new clock frequency, the FSM controller is configured to iteratively,
      cause the PLL to slew the clock frequency toward the new clock frequency by an increment to reach an intermediate frequency without interfering with normal memory system operation;
      signal a memory controller to pause normal memory system operation by completing or cancelling all in-flight memory system operations and not accepting additional memory operation requests;
      upon receiving an acknowledgement from the memory controller that all in-flight memory operations have completed or terminated, to signal the memory controller to cause a DLL inside the memory system to relock to the intermediate frequency; and to
      cause the memory subsystem to resume normal memory system operation when the DLL relocks to the intermediate frequency.

14. The apparatus of claim 13, wherein slewing the clock frequency towards the new frequency by the increment involves gradually changing the clock frequency generated by the PLL.

15. The apparatus of claim 13, wherein causing the DLL to relock involves:
   causing the memory system to enter and exit a self-refresh mode, wherein exiting the self-refresh mode causes the DLL to relock; or
   issuing an explicit DLL reset command to the DLL.

16. The apparatus of claim 13, further comprising:
   a first register that stores a target value for the clock frequency, wherein the target value represents the new clock frequency; and
   a second register that stores a step size which specifies the size of the increment.

17. The apparatus of claim 16, wherein the FSM controller is configured to initiate a subsequent iteration after completing an iteration by incrementing/decrementing a frequency synthesis parameter in the PLL toward the target value by the step size.

* * * * *